United States Patent [19]

Fields

[11] 4,441,997
[45] Apr. 10, 1984

[54] LIQUID FILTRATION SYSTEM
[75] Inventor: Larry D. Fields, Mira Loma, Calif.
[73] Assignee: Yardney Electric Corporation, Pawcatuck, Conn.
[21] Appl. No.: 469,888
[22] Filed: Feb. 25, 1983
[51] Int. Cl.³ .................... B01D 25/06; B01D 25/08
[52] U.S. Cl. ..................................... 210/266; 210/291
[58] Field of Search ............... 210/266, 283, 289, 291, 210/504, 506, 510, 290

[56] References Cited
U.S. PATENT DOCUMENTS
3,950,251  4/1976  Hiller .................................. 210/266
4,366,054 12/1982  Kronsbein .......................... 210/266

Primary Examiner—Ivars C. Cintins
Attorney, Agent, or Firm—Donald E. Nist

[57] ABSTRACT

An improved liquid filtration system is provided which comprises, in combination, a tank or other vessel having a central cavity and a liquid inlet tube and liquid outlet tube spaced apart. A porous self-supporting filter is arched over the liquid outlet tube and forms part of the system. The filter comprises granules cemented together by organic resin. For example, fine aggregate stone particles are cemented together by an epoxy resin so that the filter is both porous and strong. Preferably, the upstream portion of the filter contains a first layer of fine aggregate while the downstream portion of the filter contains a layer of larger aggregate. The system also includes a connector releasably securing the filter over the outlet tube. The filter is relatively small, occupies only a small portion of the bottom of the tank, can be removed for cleaning and replacement and is light in weight. Preferably, the filter has an upstream cover portion of a porous metal plate material in domed configuration. The filter is inexpensive, durable and efficient. A mass of loose particles of filtering medium is disposed in the tank above the rigid filter and the tank is supported on depending legs.

5 Claims, 4 Drawing Figures

LIQUID FILTRATION SYSTEM

BACKGROUND OF THE INVENTION

1. Field of the Invention

The present invention generally relates for filtering means and more particularly pertains to a liquid filtering system for agricultural and industrial water and the like.

2. Prior Art

Various types of water filtration systems are in use to upgrade water for agricultural, industrial and domestic purposes. One commercial type of filtering system comprises a large metal or plastic tank having an inlet and an outlet remotely located from each other and containing in the central cavity of the tank adjacent the outlet a very large body of crushed rock or the like aggregate material cemented together by epoxy resin into a self-supporting porous mass. In some instances, the upstream portion of this mass is formed with fine particle size aggregate while the downstream portion is formed with larger size aggregate. Usually, the mass is formed in situ, with a bottom grating or screen supporting the mass slightly above the tank outlet. The mass is designed to occupy the entire bottom of the tank to prevent water from bypassing it before exiting the tank. The mass is extremely heavy and normally cannot be removed from the tank for replacement or repair unless the tank is torn apart. While this type of water filtration system is efficient, because of its extremely high weight it is costly to ship to the locations where it must be installed to be used. As noted above, it normally does not have the capability of being repaired without extensive cost.

Accordingly, there is a need for an improved type of water filtration system which can also be used in the filtration of other liquids. Such a system should be inexpensive, relatively light weight and capable of having the filter repaired and replaced as needed without necessitating destruction of the tank in which the filter is secured. The system should also effectively prevent blowup of the tank during back washing if the pores of the filter become plugged. In convention large mass filters, as described above, tanks may blow up if the filters are plugged and the tank is back washed, causing destruction of the filtration system.

SUMMARY OF THE INVENTION

The improved liquid filtration system of the present invention satisfies all the foregoing needs. The system is substantially as set forth in the Abstract above. Thus, the system comprises a tank or vessel having a central cavity and liquid inlets and outlets. A small porous self-supporting filter is releasably secured in the vessel over the outlet by a frangible connector. The filter is light in weight, efficient, easily repairable and replaceable and prevents blowing up of the tank if the filter becomes plugged. Thus, excessive back pressure will result in separation of the filter from around the outlet, by distortion or breaking of the connector, thus relieving the back pressure and preventing major damage to the vessel.

The filter comprises a body formed of aggregate cemented together by set organic resin such as epoxy resin or the like. The body is preferably arched over the outlet to increase its structural strength and most preferably is disposed in a dome of porous metal, the dome being positioned on the upstream side of the body. The body preferably has a first upstream layer of fine aggregate and a second downstream layer of larger aggregate. Various other features of the improved liquid filtration system of the present invention are set forth in the accompanying drawings and detailed description.

DRAWINGS

DETAILED DESCRIPTION

Figure 1:
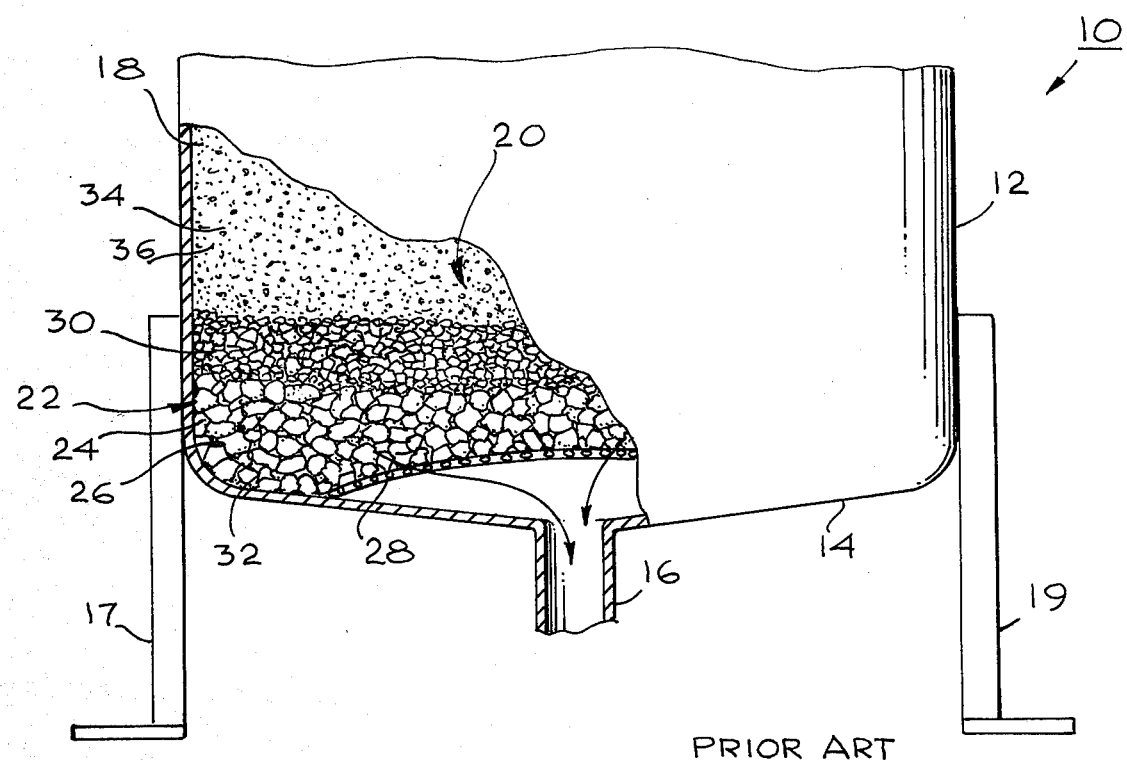
FIG. 1 is a schematic fragmentary side elevation, partly broken away and partly in section, of a conventional filtration system employing a large aggregate filter.
Figure 2:
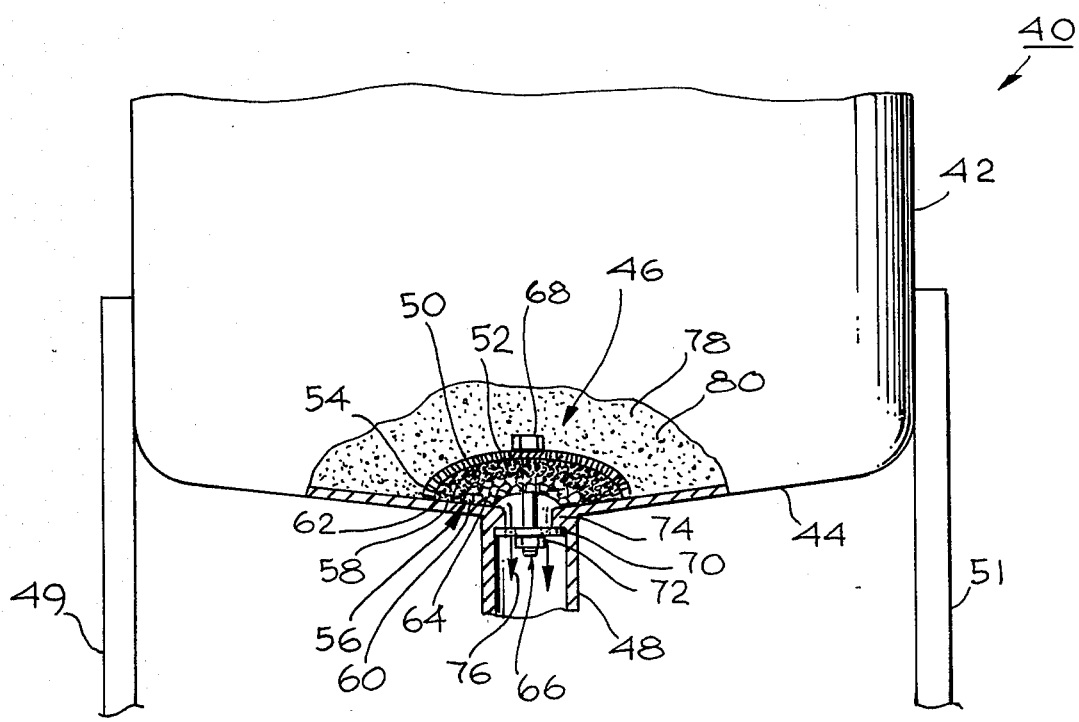
FIG. 2 is a schematic fragmentary view, partly in section, of a first preferred embodiment of the improved filtration system of the present invention.

FIGS. 1 and 2

FIG. 1 illustrates a type of conventional water filtration system commercially in use. Thus, system 10 is schematically illustrated, which system comprises a tank 12, the bottom 14 of which has a lower liquid outlet 16. Tank is supported by a pair of depending legs 17 and 19 secured, as by welding, bolting, etc. to tank 12. In the hollow interior 18 of tank 12 is disposed a filter 20 positioned at bottom 14 and comprising a large body 22 of aggregate particles 24 held together in a self-supporting mass by a matrix 26 of set epoxy resin or the like. Body 22 may be supported in part by a bottom screen 28 positioned over outlet 16. Body 22 includes an upstream layer 30 wherein aggregate particles 24 therein are of smaller size than the aggregate particles 24 in a downstream layer 32, also in body 22.

It will be noted that body 22 occupies substantially the entire bottom 14 of tank 12, except for the area immediately around outlet 16. Inasmuch as most of such tanks 12 are of relatively large diameter, a typical weight for body 22 is up to 700 pounds or more so that tank 12 with body 22 installed therein is very heavy and is difficult and expensive to transport. Moreover, body 22 normally is formed in situ in tank 12 and cannot be removed therefrom without tearing tank 12 apart.

Tank 12 also includes a large mass 34 of loose particles 36 of, for example, sand, crushed gravel or the like supported in interior 18 by body 22 and acting as the initial filtering medium in tank 12.

FIG. 2 schematically illustrates a first preferred embodiment of the improved liquid filtration system of the present invention. Thus, system 40 is shown. System 40 can utilize a tank 42 generally similar to tank 12, in the bottom 44 of which is disposed an improved rigid filter 46 which is arched directly over the bottom liquid outlet 48 of tank 42. Tank 42 is supported by a pair of depending legs 49 and 51 secured thereto, as by welding, bolting, etc.

Filter 46 comprises a domed metal plate 50 of steel, aluminum or the like which is porous. Plate 50 includes a domed top 52 and depending peripheral sides 54, the bottom of which rest on bottom 44, as shown in FIG. 2. Body 56 of inorganic particles 58, such as crushed rock, sand and the like set into a porous mass by a matrix 60 of set organic resin, is disposed within plate 50. Matrix 60 can comprise, for example, any structurally stable resin which does not dissolve in the liquid being filtered. For example, epoxy, phenolic, ureaformaldehyde and other types of resins can be employed. Normally matrix 60 is utilized for filtering water but can also be utilized to filter other liquids such as alcohol solutions, organic liquids from various chemical processes, etc.

Body 56 preferably is divided into an upstream top layer 62 containing particles 58 of, for example, about 0.025" to about 0.050" average diameter to provide about 0.004" to about 0.008" average pore size and a lower downstream layer 64 upon which layer 62 rests and is connected. The average diameter of particles 58 in layer 64 may be, for example, about 0.300" to about 0.400", providing an average pore size of about 0.015" to about 0.020".

Filter 46 is releasably connected to tank 42 at outlet 48 by a connector assembly 66 which comprises a threaded bolt 68 extending vertically down through the center of plate 50 and body 56 and also through the center of washer 70 and nut 72 disposed on the underside of washer 70. Washer 70 is perforated to permit the flow of water down through outlet 48. Washer 70 abuts a shelf or lip 74 built into outlet 48 so that by tightening nut 72 filter 46 is drawn down tightly against bottom 44. In the position shown in FIG. 2, filter 46 arches over and completely covers outlet 48.

Preferably, filter 46, plate 50 and body 56 are circular in plan view. Liquid 76 in tank 42 cannot exit through outlet 48 without passing through filter 46. When filter 46 needs to be removed for repair and/or replacement, nut 72 can be removed from bolt 68 and filter 46 can be lifted out of tank 42. Since filter 46 occupies only a very small portion of bottom 44, it is light in weight, less expensive than body 22 and substantially reduces the cost and weight of system 40. Moreover, a larger amount of tank 42 can be used to hold liquid than formerly possible.

Tank 42 also includes a large mass 78 of loose particles 80 of, for example, sand, finely crushed gravel, etc. supported on rigid filter 46 and acting as the initial filtering medium in tank 42.

FIG. 3

Figure 3:
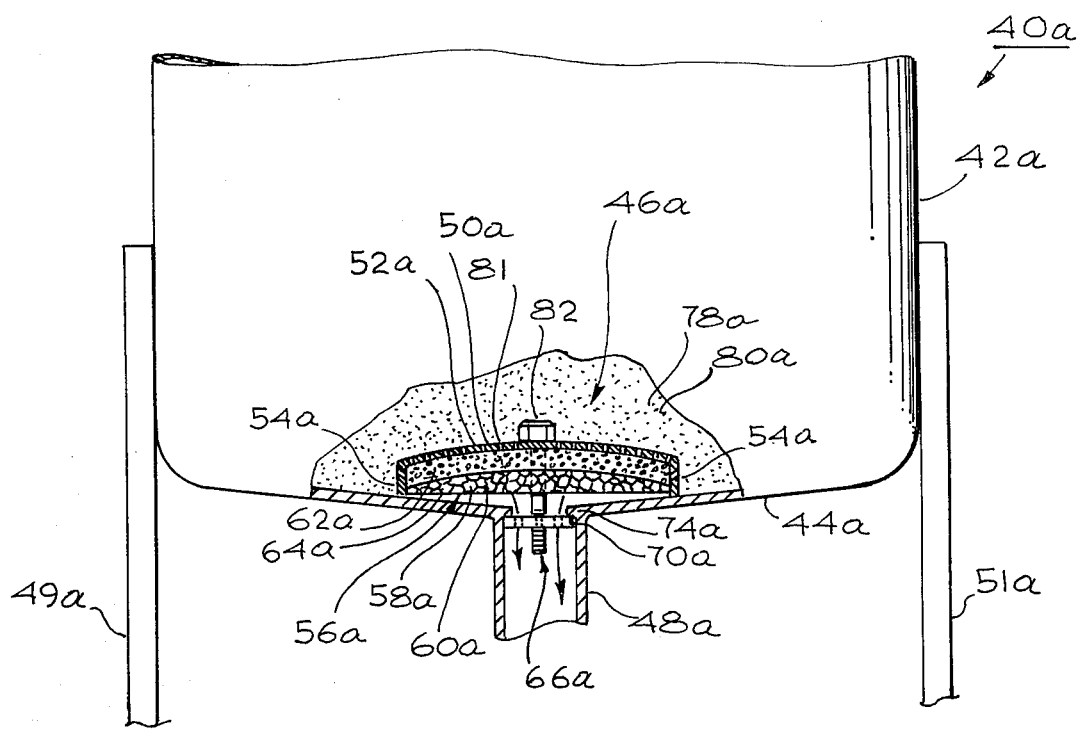
FIG. 3 is a schematic fragmentary view, partly in section, of a second preferred embodiment of the improved liquid filtration system of the present invention; and, FIG. 4 is a fragmentary schematic view, partly in section, of a third preferred embodiment of the improved liquid filtration system of the present invention.

A second preferred embodiment of the improved liquid filtration system of the present invention is schematically depicted in FIG. 3. Thus, system 40a is shown. Components thereof, similar to those of system 40 bear the same numerals but are succeeded by the letter "a". System 40a includes tank 42a, having a sloped bottom 44a fitted with outlet 48a. A filter 46a is arched over outlet 48a. Tank 42a is supported by depending legs 49a and 41a secured thereto, as by welding, bolting, etc.

Rigid filter 46a comprises a slightly domed metallic plate 50a having a plurality of apertures 80 extending down therethrough. Plate 50a is square in top plan view, having depending sides 54a and a domed top 52a. Plate 50a encloses on the upstream end and sides thereof an arched body 56a comprised of particles 58a of aggregate, that is crushed rock or the like disposed in a solid matrix 60a of set organic resin or the like. Body 56a includes an upper layer 62a containing fine particles 58a and a lower layer 64a containing larger particles 58a.

Filter 46a is releasably connected to tank 42a by connector assembly 66a comprising a threaded screw 82 extending down through plate 50a, body 56a and washer 70a which abuts the underside of shelf 74a in outlet 48a. Washer 70a is threaded to receive screw 82 so that tightening of screw 82 draws filter 46a down against bottom 44a for releasable securement thereto. System 40a has substantially the same advantages as system 40. However, system 40a employs a substantially larger filter of a different configuration than that of system 40.

Tank 42a also includes a large mass 78a of loose particles 80a of sand, finely crushed gravel, etc. supported on rigid filter 46a and acting as the initial filtering medium in tank 42a.

FIG. 4

Figure 4:
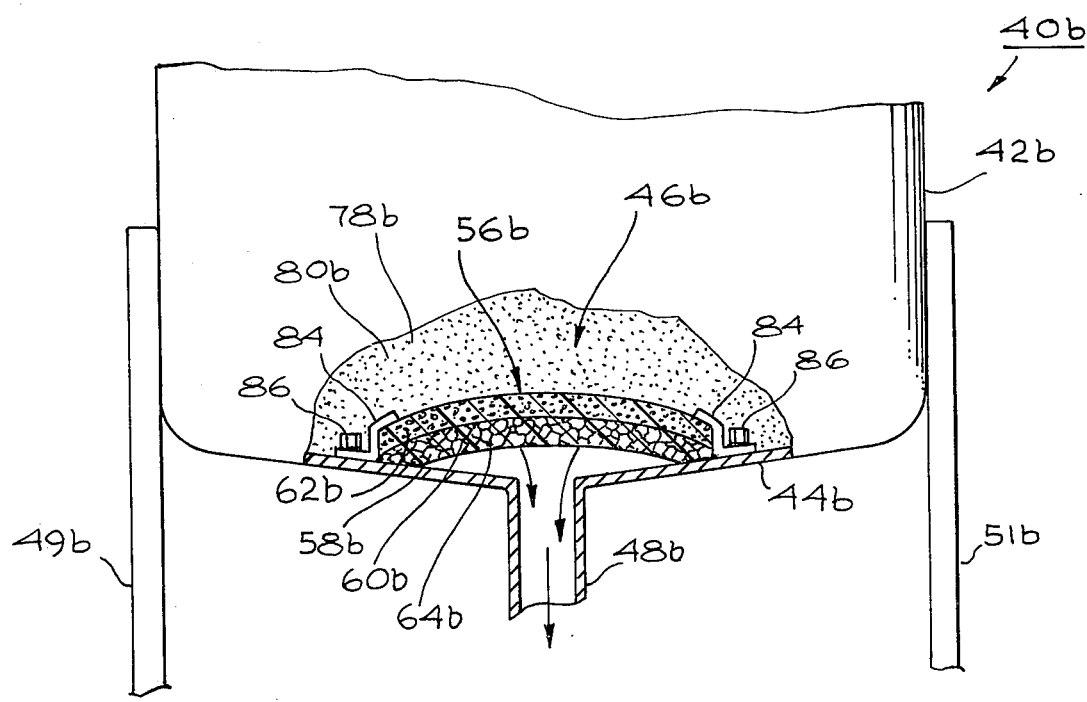

A third preferred embodiment of the improved liquid filtration system of the present invention is schematically depicted in FIG. 4. Thus, system 40b is shown. Components thereof similar to those of system 40 and/or 40a bear the same numerals but are succeeded by the letter "b". Thus, system 40b includes tank 42b having sloped bottom 44b in which a filter 46b is installed over an outlet 48b. Tank 42b is supported by depending legs 49b and 51b secured thereto, as by welding, bolting, etc. Filter 46a does not contain a metallic plate but, instead, comprises a rigid body 56b which is substantially circular in plan view and is arched as shown in FIG. 4. Body 56b is formed of particles 58b set in a matrix 60b and divided into an upper layer 62b and lower layer 64b. The particles 58b in upper layer 62b are smaller in average diameter than those in lower layer 64b.

Filter 46b is releasably connected to bottom 44b by a plurality of brackets 84 releasably secured to the periphery of body 50b, as by threaded bolts 86. System 40b is otherwise similar to systems 40 and 40a and has substantially the same advantages.

As in tanks 42 and 42a, tank 42b also includes a large mass 78b of loose particles 80b of, or example, sand, finely crushed gravel, etc. supported on rigid filter 46b and acting as the initial filtering medium in tank 42b.

The improved system of the present invention can be utilized for a variety of uses and the components thereof can be of any suitable proportions. However, in a typical agricultural filtration application, the tank employed will be about 12–48 inches in diameter with a height of about 16–60 inches and the rigid filter employed will generally be somewhat of the order of about 12–16 inches in diameter, 1–2 inches in thickness in the outer periphery and substantially thicker when measured at the vertical centerline. Typically, finely crushed aggregate or sand, for example, about 0.031" average diameter, is used in the downstream layer of the rigid filter body while pea gravel size aggregate, for example, about 0.312" average diameter, is used in the downstream layer in the filter body. It will be understood, however, that only one layer need be present and the particle size and pore size of that layer will differ in average diameter, depending upon the use to which the system is to be applied. A typical rigid filter for an average size tank will usually weigh only about 10–20 pounds instead of up to 700 pounds or more as in the previously described conventional filter systems of FIG. 1 of the drawings. In the event that the pores of the rigid filter of the present system become plugged and upon back washing the tank an excessive back pressure develops, the connector releasably securing the filter to the tank will bend or rupture to relieve the back pressure and separate the rigid filter from the tank bottom, thus opening the outlet without destroying the tank. This separation can be easily effected by controlling the strength of the retainer bolts, washers, screws and the like, provided in the connector and represents a substantial advantage over the conventional system set forth in FIG. 1.

Various other advantages are as set forth in the foregoing. Various changes, alterations, modifications and additions can be made in the improved filtration system of the present invention and in the components thereof. All such changes, modifications, alterations and additions as are within the scope of the appended claims form part of the present invention.

What is claimed is:

1. An improved liquid filtration system, such system comprising, in combination:
    a. a vessel having a plurality of spaced interconnected walls defining a central cavity and having a liquid inlet and a liquid outlet;
    b. a porous, self-supporting rigid filter comprising a self-supporting body formed of a plurality of granules cemented together by set organic resin, said filter including a domed porous metallic plate disposed around said body, said body occupying only that portion of said vessel cavity which is adjacent said outlet, said body being arched over said outlet in a structurally stable configuration;
    c. connector means releasably securing said body in said cavity adjacent said outlet so as to cover said outlet; and,
    d. a mass of loose particles of filtering medium disposed above and around said rigid filter in said cavity and supported thereby.

2. The improved system of claim 1 wherein said connector means comprises bracket means releasably securing said body against the adjacent surface of said vessel wall.

3. The improved system of claim 2 wherein said connector means comprises a plurality of spaced brackets sealing the perimeter of said body against said vessel wall to prevent leakage therearound.

4. The improved system of claim 1 wherein said connector means comprises frangible bolt means extending through said plate and body and into releasable securement with a bracket positioned in said outlet and wherein said loose particles comprise sand.

5. The improved system of claim 1 wherein said body includes an upstream layer wherein said granules are of fine particulate form and wherein said body further includes a downstream layer wherein said granules are larger than the granules in said first layer, said first and second layers being sealed together.

* * * * *